Sept. 28, 1965 A. LANGRIDGE ETAL 3,209,216
SEALED ELECTRICAL DEVICES
Filed Jan. 16, 1963
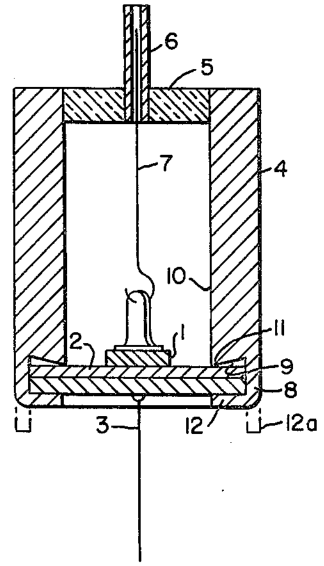
WITNESSES:
Bernard R. Giegner
Raymond H. Majesko
INVENTORS
Arthur Langridge &
James Ladd.
BY
C. L. Menzemer
ATTORNEY

United States Patent Office 3,209,216
Patented Sept. 28, 1965

3,209,216

SEALED ELECTRICAL DEVICES

Arthur Langridge and James Ladd, London, England, assignors to Westinghouse Brake & Signal Company Limited, London, England, a corporation of Great Britain Filed Jan. 16, 1963, Ser. No. 251,802
Claims priority, application Great Britain, Jan. 24, 1962, 2,642/62
2 Claims. (Cl. 317—234)

The present invention relates to sealed electrical devices and a method for encapsulating the same.

Heretofore in the fabrication of semiconductor devices, it has been a practice to attach a semiconductor member to a base and subsequently cover a member with a housing which is soldered or welded to the base. This process may often introduce some undesirable effects such as contaminating the semiconductor member with a flux when soldering, or shorting the member with weld splashes or overheating the semiconductor member during welding.

It is an object of this invention to provide a semiconductor device in which a tubular housing enclosing a semiconductor member mounted on a base is mechanically joined to the base.

Another object of the invention is to provide a semiconductor device comprising a semiconductor member, at least one electrode contact on a major surface of the member, an electrically conducting heat dissipating base for the assembly of electrode contacts and semiconductor member, and a tubular housing enclosing the assembly, in which a portion of reduced wall thickness extends from the lower end of the housing which at its junction with the remainder of the housing provides a shoulder terminating on the interior wall of the housing in an annular knife edge directed towards one end thereof, the base being disposed within the lower end of the housing at the reduced wall thickness portion and abutting the knife edge, a section of the portion of reduced wall thickness having been swaged over the lower end of the base to firmly secure the base between said knife edge and said swaged section to provide a firm mounting for the semiconductor member.

Other objects of the invention will in part, be obvious and will in part, appear hereinafter.

In order to more fully understand the nature and objects of the invention, reference should be had to the following detailed description and drawing, the single figure of which is an elevation view, partly in cross section, of a semiconductor device.

In accordance with the present invention and in attainment of the foregoing objects there is provided, a sealed electrical device comprising a tubular housing having a portion of reduced wall thickness extending from the lower end thereof. The junction of the portion forms a shoulder terminating on the interior wall of the housing in an annular knife edge. An insulating disc washer having an electrical conductor passing therethrough is joined to the inner periphery of the housing at the extreme upper end thereof. An electrical lead contact is joined at one end to the electrical conductor passing through the insulating washer. The other end of the contact is joined to one end of a semiconductor member which is disposed within the housing. A base plate is joined to the other end of the semiconductor member and is disposed within the lower end of the housing at the reduced wall thickness portion and abuts the knife edge. A section of the portion of reduced wall thickness is swaged over a circular insert abutting the lower end of the base to firmly secure the base and the circular insert between the knife edge and the swaged section. An electrical conductor extends from the lower end of the circular insert.

Referring to the figure, there is shown a semiconductor member 1 mounted on a base plate 2 to which is connected an electrical lead 3. The member 1 is enclosed in a tubular housing 4 sealed at its upper end by a glass disc 5 having an electrical conductor 6 passing therethrough into which extends an electrical lead contact 7 from the member 1.

The portion of the housing 4 adjacent the lower end thereof has extending therefrom a portion 8 of reduced wall thickness. The junction of this portion 8 with the remainder of the housing 4 forms a shoulder 9 terminating on the interior wall 10 of the housing 4 in an annular knife edge 11. The base plate 2 is held firmly in engagement with the knife edge 11 by the portion 12 of the housing wall adjacent the lower end having been swaged over.

The portion 12 of the housing 4 was originally in the position 12A as shown by dotted lines. The base plate 2 with the member 1 mounted thereon was then inserted into the portion 8 of reduced wall thickness so that the base plate 2 abutted the knife edge 11. Subsequently, the portion 12A was swaged into its position 12 so that the knife edge 11 firmly engaged the base plate 2. Thereafter, the conductor 6 may be crimped at its mid portion into sealing engagement with the lead 7.

With the above described arrangement, it has been found that the positioning of the knife edge 11 internally of the housing 4 provides improved sealing between the housing 4 and the base plate 2. Furthermore, by the internal provision of the knife edge 11, it is protected from damage otherwise arising from handling and treatment processes subsequent to manufacture of the housing 4.

It is to be understood that the above description and drawing be interpreted as illustrative and not limiting.

We claim as our invention:

1. A sealed electrical device comprising, a tubular housing having a portion of reduced wall thickness extending from the lower end thereof, the junction of the portion forming a shoulder terminating on the interior wall of the housing in an annular knife-edge; an insulating disc washer having an electrical conductor passing therethrough joined to the inner periphery of the housing at the extreme upper end thereof, an electrical lead contact joined at one end to the lower end of the electrical conductor passing through the insulating washer, the other end being soldered to one end of a semiconductor member which is disposed within the housing, a base plate joined to the other end of the semiconductor member, the base plate being disposed within the lower end of the housing at the reduced wall thickness portion and abutting the knife edge, a section of the portion of reduced wall thickness having been swaged over the lower end of the base to firmly secure the base between said knife edge and said swaged section and an electrical conductor extending from the base.

2. In combination with a semiconductor device comprising a semiconductor member, at least one electrode contact on a major surface of the member, an electrically conducting heat dissipating base for the assembly of electrode contacts and semiconductor member, and a tubular housing enclosing the assembly, the improvement comprising a portion of reduced wall thickness extending from the lower end of the housing which at its junction with the remainder of the housing provides a shoulder terminating on the interior wall of the housing in an annular knife-edge directed toward one end thereof, the base being disposed within the lower end of the housing at the reduced wall thickness portion and abutting the knife edge, a section of the portion of reduced wall thickness having been swaged over the lower end of the base to firmly secure the base between said knife edge and said swaged section to provide a firm mounting for the semiconductor member.

References Cited by the Examiner

UNITED STATES PATENTS

| | | | |
|---|---|---|---|
| 244,804 | 7/81 | Gillespie | 29—511 X |
| 1,597,889 | 8/26 | Hulbert | 29—511 X |
| 1,991,591 | 2/35 | Abbott | 338—274 X |
| 2,046,922 | 7/36 | Minnium | 338—273 |
| 2,414,836 | 1/47 | Richmeyer | 174—52.5 X |
| 3,055,084 | 9/62 | Canegallo | 29—155.63 |
| 3,064,335 | 11/62 | Fletcher | 29—155.63 |
| 3,101,466 | 8/63 | Armstrong | 338—273 |
| 3,150,297 | 9/64 | Pipping | 317—234 |

RICHARD M. WOOD, *Primary Examiner.*